(12) United States Patent
Kimura (10) Patent No.: US 8,659,728 B2
(45) Date of Patent: Feb. 25, 2014

(54) LIQUID CRYSTAL DISPLAY DEVICE COMPRISING COMPENSATION FILMS HAVING NEGATIVE PHOTO-ELASTIC CONSTANT

(75) Inventor: Shinichi Kimura, Kanagawa-ken (JP)

(73) Assignee: LG Display Co., Ltd., Seoul (KR)

( * ) Notice: Subject to any disclaimer, the term of this patent is extended or adjusted under 35 U.S.C. 154(b) by 152 days.

(21) Appl. No.: 11/430,368

(22) Filed: May 9, 2006

(65) Prior Publication Data

US 2006/0270084 A1    Nov. 30, 2006

(30) Foreign Application Priority Data

May 9, 2005  (JP) ................. P2005-136239

(51) Int. Cl.
*G02F 1/1335* (2006.01)
*G02F 1/1333* (2006.01)

(52) U.S. Cl.
USPC ............ 349/117; 349/12; 349/96; 349/118; 349/119; 349/120; 349/158

(58) Field of Classification Search
USPC ............ 349/12, 96, 117–119, 158, 192, 194, 349/120
See application file for complete search history.

(56) References Cited

U.S. PATENT DOCUMENTS

| | | | | |
|---|---|---|---|---|
| 6,067,392 A * | 5/2000 | Wakami et al. | ................. | 385/37 |
| 6,565,974 B1 * | 5/2003 | Uchiyama et al. | ............ | 428/412 |
| 6,628,359 B1 * | 9/2003 | Terashita et al. | ............. | 349/120 |
| 6,812,983 B2 * | 11/2004 | Arakawa | ........................ | 349/117 |
| 7,268,770 B1 * | 9/2007 | Takahata et al. | ............... | 345/173 |
| 2002/0060762 A1 * | 5/2002 | Arakawa | ........................ | 349/117 |
| 2004/0201805 A1 * | 10/2004 | Nishikouji et al. | ........... | 349/117 |
| 2005/0024576 A1 * | 2/2005 | Sato et al. | ...................... | 349/158 |
| 2005/0105027 A1 * | 5/2005 | Wada et al. | .................... | 349/117 |

FOREIGN PATENT DOCUMENTS

| | | | | |
|---|---|---|---|---|
| JP | 06-160878 | 6/1994 | | |
| JP | 06-321907 | 11/1994 | | |
| JP | 11-149071 | 6/1999 | | |
| JP | 11149071 A * | 6/1999 | ........... | G02F 1/1335 |
| JP | 2000-206303 | 7/2000 | | |
| JP | 2002-341140 | 11/2002 | | |
| JP | 2002341140 A * | 11/2002 | .............. | G02B 5/30 |
| JP | 2003-090913 | 3/2003 | | |
| KR | 2001-33970 | 4/2001 | | |

OTHER PUBLICATIONS

Office Action issued in corresponding Japanese Patent Application No. 2005-136239, mailed Apr. 23, 2012.

* cited by examiner

*Primary Examiner* — Lucy Chien
*Assistant Examiner* — Paisley L Arendt
(74) *Attorney, Agent, or Firm* — Brinks, Gilson & Lione (57) ABSTRACT

Described herein is an LCD device in which retardation may be removed from a glass substrate when stress is applied to a display screen, thereby minimizing light leakage from the display screen. In the LCD device, a film having a negative photo-elastic constant (NPEC) is arranged to adjoin glass substrates so as to remove photo-elasticity. Specifically, in the LCD device, the NPEC films having negative photo-elasticity are respectively arranged at upper and lower sides of a liquid crystal cell, wherein the liquid crystal cell includes opposing glass substrates with a liquid crystal layer disposed therebetween.

11 Claims, 5 Drawing Sheets

Isoluminance contour

FIG. 8

Isoluminance contour

LIQUID CRYSTAL DISPLAY DEVICE COMPRISING COMPENSATION FILMS HAVING NEGATIVE PHOTO-ELASTIC CONSTANT

This application claims the benefit of the Japanese Patent Application No. P 2005-136239, filed on May 9, 2005, which is hereby incorporated by reference as if fully set forth herein.

TECHNICAL FIELD

The present disclosure relates to a liquid crystal display (LCD) device, and more particularly, to an in-plane switching (IPS) mode LCD device.

BACKGROUND

LCD devices are widely used as alternatives to cathode ray tube (CRT) displays due to their smaller size and lower power consumption.

A related art LCD device includes a twisted nematic (TN) mode LCD device, a super twisted nematic (STN) mode LCD device, and an in-plane switching (IPS) mode LCD device, wherein a thin film transistor (TFT) is arranged in each pixel to correct images displayed and display moving images.

The TN mode LCD device or the STN mode LCD device drives a liquid crystal layer in a direction of an electric field applied to the liquid crystal layer using transparent electrodes formed on opposing substrates. The direction of the electric field is substantially vertical to the substrates.

In the IPS mode LCD device, liquid crystal molecules are switched to orient horizontally with respect to a substrate using a transverse electric field which is horizontal to the substrate. In this case, since the liquid crystal molecules are not tilted and have minimal changes in optical characteristics depending on viewing angle, it is possible to obtain a wider viewing angle than that of the TN mode LCD device or the STN mode LCD device (for example, see Patent References 1 and 2).

Furthermore, the technology relating to an elliptical polarizer, which may control mura displayed by retardation occurring due to stress (for example, see Patent Reference 3), is known. The stress may occur as a polarizing film is distorted due to temperature or humidity.

Patent Reference 1: Japanese Patent Publication S63-21907;
Patent Reference 2: Japanese Patent No. 2940354; and
Patent Reference 3: Japanese Publication No. 2003-90913

However, in the LCD device based on the aforementioned technology, when a display screen is touched with a finger or a pen in a region for manipulating a touch panel, stress is applied to the touched portion. As a consequence, retardation may occur, causing light leakage. Particularly, in the IPS mode LCD device of a normal black type, light leakage may be indicated by a white spot when black is displayed.

SUMMARY

Accordingly, the present disclosure is directed to an LCD device that may substantially obviate one or more problems due to limitations and disadvantages of the related art. Described herein is an LCD device in which retardation may be removed from a glass substrate even when stress is applied to a display screen, thereby obtaining a display screen having minimal light leakage.

According to one embodiment, the liquid crystal display device includes first and second substrates, a liquid crystal layer between the first and second substrates, and at least one compensation film having a negative photo-elastic constant (NPEC) disposed outside at least one of the first and second substrates. The compensation film minimizes retardation of light when stress is applied to one of the first and second substrates.

According to another embodiment, the liquid crystal display device includes first and second substrates, a liquid crystal layer between the first and second substrates, and first and second compensation films each having a negative photo-elastic constant (NPEC) disposed outside the first and second substrates. The first and second compensation films minimize retardation of light when stress is applied to one of the first and second substrates.

It is to be understood that both the foregoing general description and the following detailed description are exemplary and explanatory and are intended to provide further explanation of the invention as claimed.

DETAILED DESCRIPTION

Reference will now be made in detail to various preferred embodiments, examples of which are illustrated in the accompanying drawings. Wherever possible, the same reference numbers will be used throughout the drawings to refer to the same or like parts.

If stress is applied to a normal black type LCD device, retardation may occur inside the LCD device due to a photo-elastic effect. Electric vectors of light may be pivoted to become light that transmits a polarizer band or reflective light, thereby causing light leakage in a display screen.

Due to the photo-elastic effect, a material may temporarily become an optical anisotropic body causing birefringence of light when external stress is applied. The material may return to its original state having no birefringence after the external stress is removed. The photo-elastic effect is expressed by the following equation 1.

$$\Delta n = Csf, \quad \text{[Equation 1]}$$

wherein $\Delta n$ represents refractive anisotropy, i.e., a birefringence difference, C represents a photo-elastic constant, and f represents stress.

Figure 5:
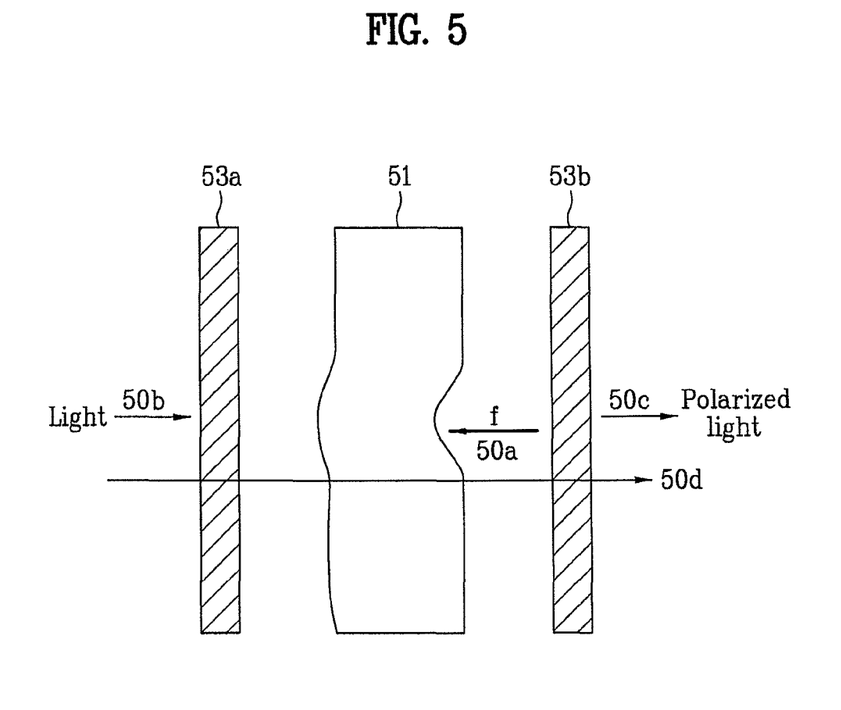
FIG. 5 illustrates a method of measuring a photo-elastic constant.

The photo-elastic constant is a unique constant of each material. FIG. 5 illustrates a method of measuring the photo-elastic constant. As shown in FIG. 5, an object 51 to be measured is arranged between polarizers 53a and 53b whose polarizing directions are orthogonal to each other. In a state that the stress f is applied along a direction 50a, light is irradiated along a direction 50b. In this case, the object 51 is made of a transparent material, and distortion occurs in all direction around a portion of the object 51 to which the stress f is applied.

If photo-anisotropy occurs in the object 51 due to such distortion, the irradiated light may be pivoted to cause a variation of transmittance.

The photo-elastic constant of the object 51 may be measured using a refractive index obtained by observing polarizing light irradiated along a direction 50c.

The birefringence of the observed polarizing light may be proportional to the size of the photo-elastic constant of the object 51, as apparent from equation 1 of the aforementioned photo-elastic effect.

Also, the amount of retardation occurring in the object 51 is indicative of a size of a pivot angle of an electric vector of light propagating inside a material having a thickness d, and is expressed as Δnd, which is obtained by multiplying refractive anisotropy Δn and the thickness d of the material together, wherein the light enters the material having the thickness d and becomes elliptically polarized light by means of the refractive anisotropy of the material.

The photo-elastic constant includes a positive constant and a negative constant. A material may have a positive photo-elastic constant or a negative photo-elastic constant.

If a vector of stress is included in an X-Y plane along an X direction, the material having the positive photo-elastic constant has a high refractive index in the X direction, while the material having the negative photo-elastic constant has a high refractive index in the Y direction.

If the material having the positive photo-elastic constant is combined with the material having the negative photo-elastic constant, the materials may remove photo-elasticity from each other.

The IPS mode LCD device is generally driven in a normal black mode. In this mode, black is displayed when no electric field is applied, and white is displayed when there is an electric field.

Figure 6:
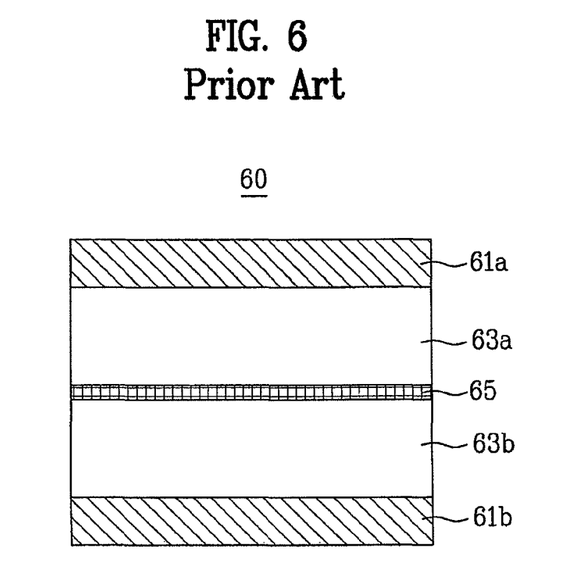
FIG. 6 illustrates a related art LCD device.

FIG. 6 illustrates a related art LCD device.

As shown in FIG. 6, the related art LCD device includes a liquid crystal 65 sealed between two glass substrates 63a and 63b and polarizers 61a and 61b arranged above and below the glass substrates 63a and 63b. The polarizers 61a and 61b are arranged to be orthogonal to each other.

For example, in case of a homogenous direction in a normal black mode, since a longitudinal axis of liquid crystal molecules is arranged in a direction horizontal to the glass substrates, black is displayed as the longitudinal axis direction of the liquid crystal is added to any one axis of the polarizers 61a and 61b.

If stress is applied to an LCD 60 obtained by disposing the glass substrates 63a and 63b or the liquid crystal 65 between the polarizers 61a and 61b, retardation may occur due to the glass substrates 63a and 63b, thereby causing a variation in luminance. The retardation may be caused by the photo-elasticity of each material constituting the LCD 60.

In the present disclosure, the photo-elasticity of the LCD may be removed to prevent retardation from occurring when stress is applied to the LCD.

Specifically, the photo-elasticity of the LCD may be removed by using a member having a negative photo-elasticity and a member (mainly, a glass substrate) having a positive photo-elasticity.

To remove photo-elasticity using a combination of a layer of the member having positive photo-elasticity and a layer of the member having negative photo-elasticity, it is advantageous to meet the following two conditions: Preferably, the layers may have identical light axes and no anisotropic medium (e.g., a liquid crystal layer) disposed therebetween.

Retardation Δnd is expressed as the following equation 2 considering a uniaxial medium.

$$\Delta nd = (n_e - n_o)d,$$ [Equation 2]

wherein d represents a thickness of the medium, $n_e$ represents a refractive index of extraordinary light, and $n_o$ represents a refractive index of ordinary light. The retardation corresponds to a delay of ordinary light compared to the propagation speed of the extraordinary light.

For example, when two mediums of the same thickness whose extraordinary light has refractive indexes of $n_2$ and $n_3$ and whose ordinary light has refractive indexes of $n_1$ and $n_4$, are joined together along a light axis, it is preferable to meet $n_2-n_1=n_3-n_4$ to overcome the delay.

In other words, if retardation occurs due to photo-elasticity when stress is applied to the mediums, the photo-elastic constants of the two mediums may correspond to the positive photo-elastic constant and the negative photo-elastic constant, whose absolute values are the same as each other. Therefore, when the same stress is applied to the two mediums, Δn may occur to remove the delay.

However, if a medium having a different amount of retardation and a uniform axis direction of a liquid crystal is inserted between the two mediums, phase delay may occur. If the light axis of the inserted medium is uniform, phase delay may occur in the two mediums corresponding to stress, whereby retardation cannot be removed.

To solve such a problem, it may be advantageous to compensate positive photo-elasticity of a glass with a film having negative photo-elasticity without interposing a uniaxial medium, such as a liquid crystal layer, having retardation of a fixed direction.

Actually, since stress in a uniform direction is applied to the whole LCD, light axes other than the liquid crystal layer are coincident with one another in the LCD.

Therefore, if the layer of the member having positive photo-elasticity and the layer of the member having negative photo-elasticity are arranged without interposing the uniaxial medium such as the liquid crystal layer, it may be possible to more reliably remove retardation occurring in each layer.

In other words, the layer of the member having positive photo-elasticity and the layer of the member having negative photo-elasticity are preferably arranged at both upper and lower sides of a liquid crystal cell so as to remove photo-elasticity, wherein the liquid crystal cell includes two glass substrates with a liquid crystal layer interposed therebetween.

Figure 7:
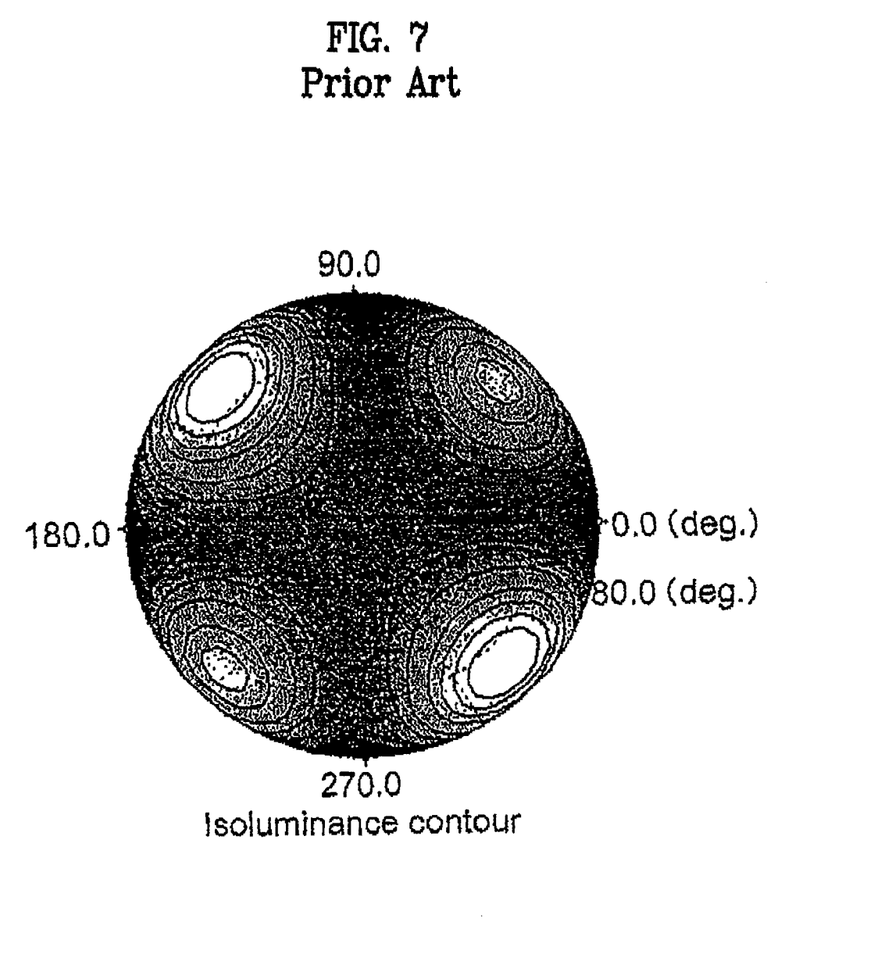
FIG. 7 illustrates viewing angle characteristics of a related art LCD device.
Figure 8:
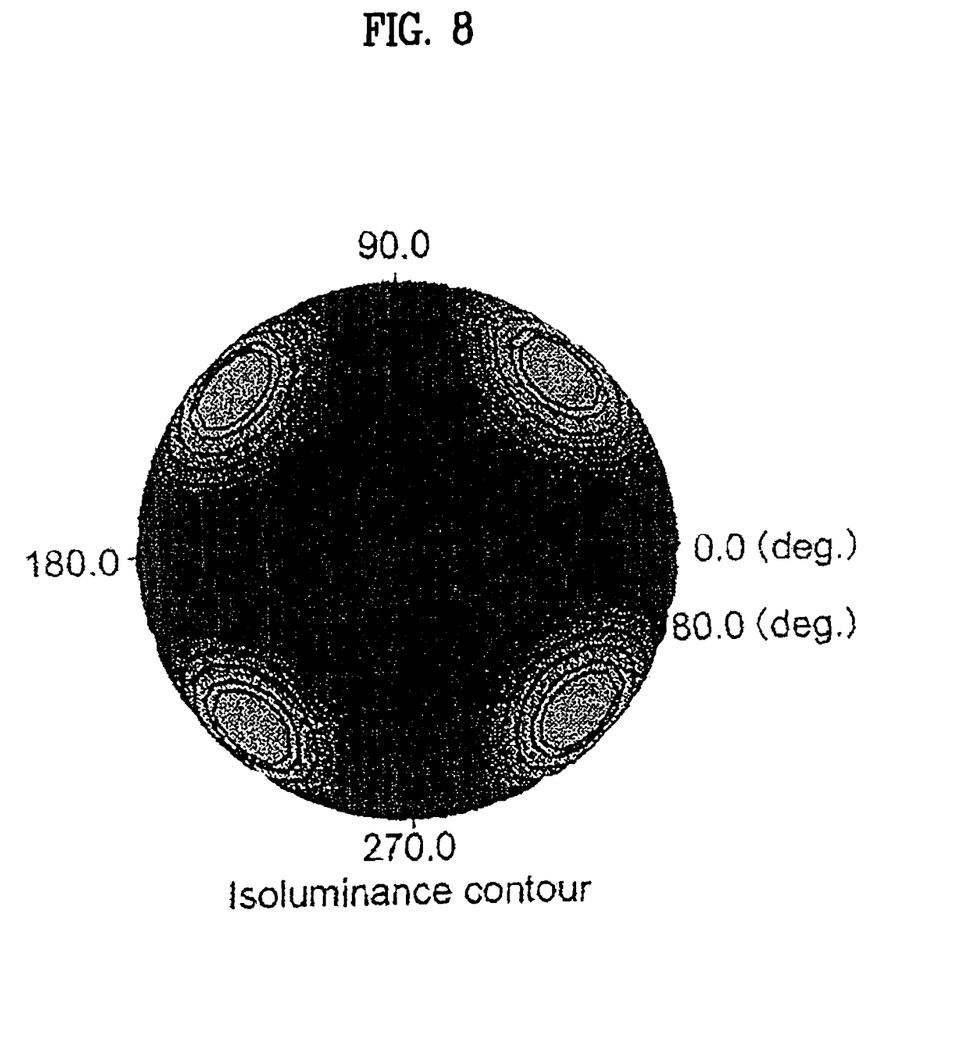
FIG. 8 illustrates viewing angle characteristics of an LCD device according to the present disclosure.

To describe effects of the LCD device according to the present disclosure, results of computer simulation relating to viewing angle characteristics are shown in FIGS. 7 and 8.

FIG. 7 illustrates viewing angle characteristics of a related art LCD device, and FIG. 8 illustrates viewing angle characteristics of an LCD device according to the present disclosure.

FIGS. 7 and 8 illustrate viewing angle characteristics when retardation occurs in a display screen in a direction of an orientation angle of 400 with respect to a horizontal direction of 0° due to stress applied to the LCD device.

Referring to FIGS. 7 and 8, a contour line represents luminance, an orientation angle represents one of a viewing angle, and a radius direction represents a pole angle of the viewing angle.

As shown in FIGS. 7 and 8, luminance is high if the orientation angle is in the range of 45°, 135°, 225°, and 315°. This is obtained based on the characteristics of orthogonal polarizers.

However, the luminance shown in FIG. 8 is lower than that shown in FIG. 7 in portions other than 45°. This shows that the LCD device of the present disclosure controls retardation when stress is applied to the display screen in comparison with the related art LCD device.

Accordingly, it is noted that the LCD device of the present disclosure may prevent or minimize light leakage from occurring due to stress.

A glass material used in a glass substrate is transparent and generates little retardation in a normal state. However, since the glass material has a positive photo-elastic constant, retardation may occur in proportion to the thickness of the glass material if stress is applied to the glass material.

Also, a material of the related art LCD device, such as triacetylcellulose (TAC) or a phase difference film, which may be used as a support plate of a polarizer, has a positive photo-elastic constant.

In the present disclosure, to remove photo-elasticity of each member constituting the LCD device, the LCD device includes a layer of a member having a negative photo-elastic constant.

Hereinafter, the LCD device according to the first to fourth embodiments will be described with reference to FIGS. 1 to 4.

First Embodiment

Figure 1:
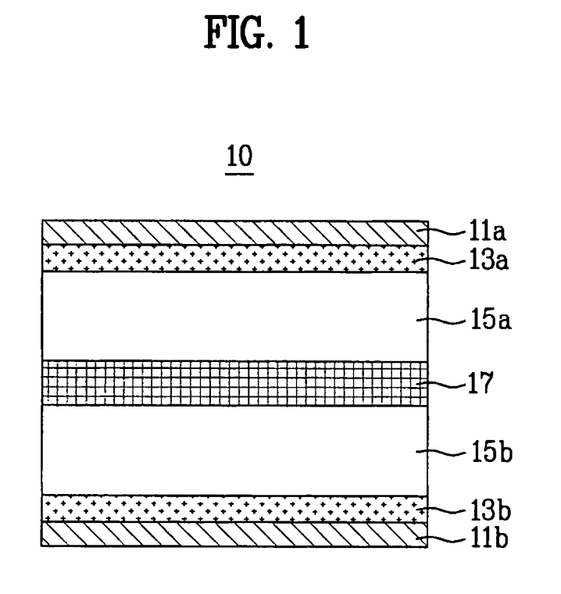
FIG. 1 illustrates an LCD device according to a first embodiment.

FIG. 1 illustrates an LCD device according to the first embodiment.

As shown in FIG. 1, an LCD 10 includes a liquid crystal 17 sealed between two glass substrates 15a and 15b to drive the LCD in an IPS mode, and polarizers 11a and 11b respectively arranged outside the glass substrates 15a and 15b with NPEC films 13a and 13b (first and second compensation films) having a negative photo-elastic constant (NPEC) disposed therebetween.

The glass substrates 15a and 15b are made of glass having a thickness of 0.5 mm to 1.1 mm. Since the photo-elastic constant of glass is (+) $10^{-12} \sim 10^{-10}$ $Pa^{-1}$, if a stress of 100 $g/mm^2$ is applied to the glass substrates having a photo-elastic constant of $3 \times 10^{-11}$ $Pa^{-1}$ and a thickness of 0.7 mm, a retardation of 23 nm occurs.

Also, the polarizers 11a and 11b may be formed by coating a polarizing layer on a substrate of TAC.

The NPEC films 13a and 13b may be formed of polystyrene, which is an exemplary material having negative photo-elasticity. Examples of other high polymers having negative photo-elasticity include polymethylmethacrylate, acrylonitrile, styrene copolymer, styrene maleic anhydride, and maleimide•styrene copolymer.

In the aforementioned LCD 10, when stress is applied to the display screen, retardation occurring in the glass substrates 15a and 15b may be controlled by the NPEC films 13a and 13b.

Among members constituting the LCD 10, the glass substrates 15a and 15b are the thickest, and therefore retardation occurring in the glass substrates 15a and 15b becomes optical retardation occurring in the LCD 10.

Second Embodiment

Figure 2:
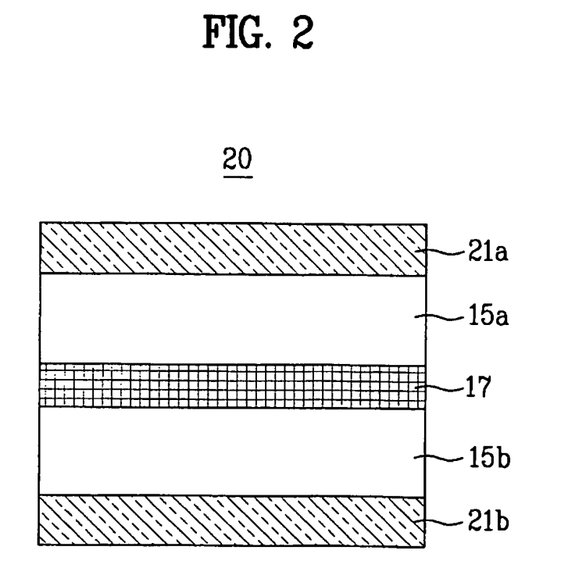
FIG. 2 illustrates an LCD device according to a second embodiment.

In the second embodiment, the LCD device is formed by using a member having a negative photo-elasticity as a polarizer without forming additional layers such as the NPEC films 13a and 13b of the aforementioned first embodiment.

Hereinafter, the LCD device according to the second embodiment of the present disclosure will be described in detail. The same reference numbers as those of the first embodiment will be used to refer to the same or like parts.

FIG. 2 illustrates the LCD device according to the second embodiment. As shown in FIG. 2, an LCD 20 includes a liquid crystal 17 sealed between two glass substrates 15a and 15b, and NPEC polarizers 21a and 21b (first and second compensation films) disposed outside both the glass substrates 15a and 15b.

The LCD 20 is different from the LCD 10 of the first embodiment in that the NPEC polarizers 21a and 21b are used. The NPEC polarizers 21a and 21b may be fabricated by using a material having a negative photo-elastic constant instead of a material such as TAC, which has a positive photo-elastic constant and is used for the related art polarizer.

Specifically, the NPEC polarizers 21a and 21b may be formed in such a manner that polarizing layers are coated on either a substrate of polystyrene having negative photo-elasticity or a high polymer having negative photo-elasticity as listed in the first embodiment.

In the aforementioned LCD 20, it may be possible to obtain the same effect as that of the first embodiment without including an additional layer having negative photo-elasticity. Also, since the number of layers is smaller than that of the first embodiment, it may be possible to reduce the production cost.

In the second embodiment, any one of the NPEC polarizers 21a and 21b may be replaced with a layer of the polarizer 11a and the NPEC film 13a or a layer of the polarizer 11b and the NPEC film 13b.

However, in this case, it is necessary to control a thickness of each member in accordance with the photo-elastic constants of the NPEC polarizer 21a or 21b or the NPEC film 13a or 13b to maintain the balance of retardation occurring in these layers.

Third Embodiment

Figure 3:
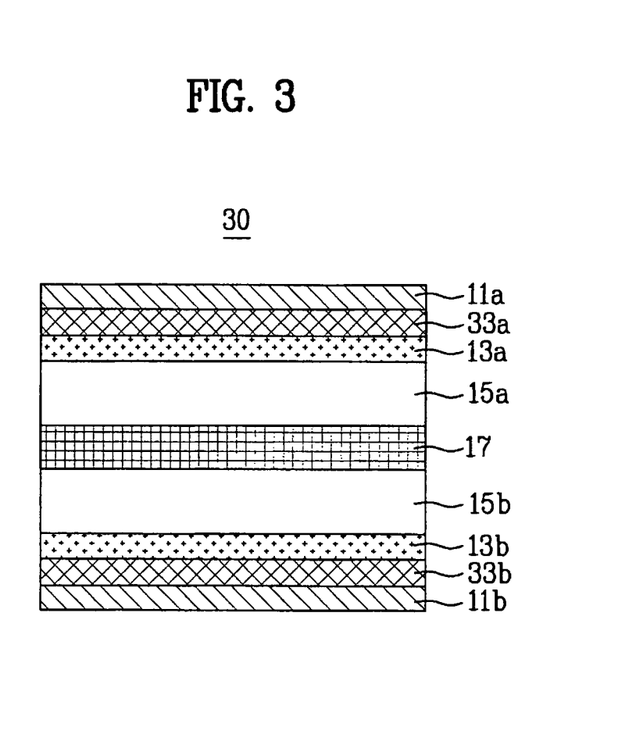
FIG. 3 illustrates an LCD device according to a third embodiment.

In the third embodiment, phase difference films are additionally arranged in the LCD 10 of the first embodiment to improve a viewing angle. Hereinafter, the LCD device according to the third embodiment of the present invention will be described in detail. The same reference numbers as those of the first embodiment will be used to refer to the same or like parts.

FIG. 3 illustrates the LCD device according to the third embodiment. As shown in FIG. 3, an LCD 30 includes a liquid crystal 17 sealed between two glass substrates 15a and 15b, NPEC films 13a and 13b disposed outside both glass substrates 15a and 15b, phase difference films 33a and 33b (first and second compensation films) disposed outside both glass substrates 15a and 15b, and polarizers 11a and 11b respectively arranged outside both the glass substrates 15a and 15b.

It is known in Japanese Patent Publication pyung 3-50249 that uniaxial elongated films, such as DAC, PET, diacetate cellulose, PVA, polyamide, polyethersulfone, acryl, polysulfone, polyimide, and polyolefine, may be used as the phase difference films 33a and 33b.

Specifically, WV films (registered trademark) made by Fuji Photo Film Co., Ltd. or LC films (registered trademark) of Nippon Oil Corporation may be used as the phase difference films.

In the aforementioned LCD 30, it may be possible to obtain the same effect as in the first embodiment by using the phase difference films 33a and 33b.

Since phase difference films 33a and 33b are provided in the LCD device provided with the LCD 30, it may be possible to obtain a wide viewing angle, prevent coloring from occurring, and reduce light leakage caused in the display screen.

Fourth Embodiment

Figure 4:
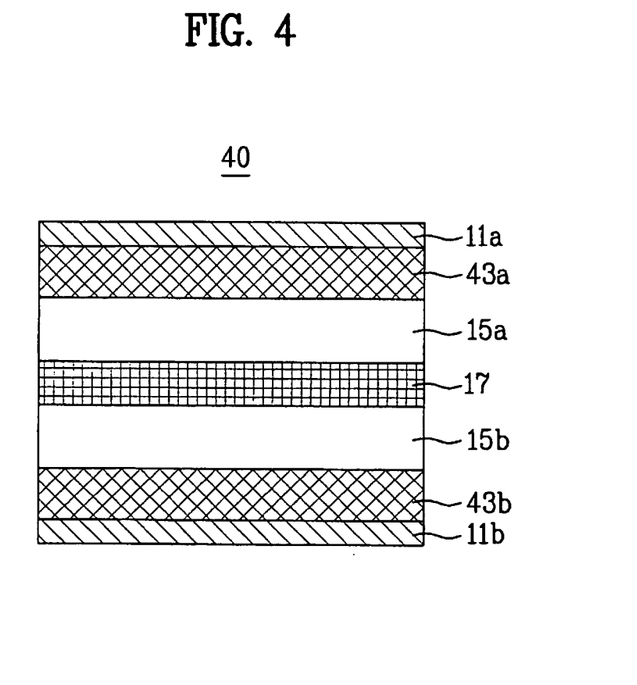
FIG. 4 illustrates an LCD device according to a fourth embodiment.

In the fourth embodiment, the LCD device is formed by using a member having negative photo-elasticity as a phase difference film without including additional layers such as the NPEC films 13a and 13b of the aforementioned third embodiment. Hereinafter, the LCD device according to the fourth embodiment of the present disclosure will be described in detail. The same reference numbers as those of the third embodiment will be used to refer to the same or like parts.

FIG. 4 illustrates the LCD device according to the fourth embodiment of the present invention. As shown in FIG. 4, an LCD 40 includes a liquid crystal 17 sealed between two glass substrates 15a and 15b, NPEC phase difference films 43a and 43b (first and second compensation films) disposed outside both the glass substrates 15a and 15b, and polarizers 11a and 11b respectively arranged outside both the glass substrates 15a and 15b.

The LCD 40 is different from the LCD 30 of the third embodiment in that the NPEC phase difference films 43a and 43b are used. The NPEC phase difference films 43a and 43b may be fabricated by using polystyrene or another high polymer having a negative photo-elasticity, such as those listed in the first embodiment, instead of a polymer such as TAC having a positive photo-elasticity, which is used for the related art phase difference films.

In the aforementioned LCD 40, it may be possible to obtain the same effect as that of the third embodiment without including an additional layer having a negative photo-elasticity. Also, since the number of layers is smaller than that of the third embodiment, it may be possible to reduce the production cost.

In the fourth embodiment of the present disclosure, any one of the NPEC phase difference films 43a and 43b may be replaced with a layer of the phase difference film 33a and the NPEC film 13a or a layer of the phase difference film 33b and the NPEC film 13b in the third embodiment.

However, in this case, it is necessary to control a thickness of each member in accordance with the photo-elastic constant of the NPEC phase difference film 43a or 43b or the NPEC film 13a or 13b to remove retardation occurring in these layers.

Further, the NPEC phase difference films 43a and 43b may be fabricated by aligning high polymer films having negative photo-elasticity in a constant direction in accordance with precise uniaxial elongation, and may be formed in a single body with the polarizers.

In this case, the NPEC phase difference films 43a and 43b may be used as a substrate and polarizing layers may be coated on the substrate in the same manner as the NPEC polarizers 21a and 21b of the second embodiment.

As described above, the LCD device according to the present disclosure may have the following advantages.

First, a compensation film, which may remove retardation generated when stress is applied to one of a pair of glass substrates, may be arranged to be adjacent to one of the glass substrates without disposing an anisotropic medium therebetween. Thus, the photo-elasticity of the LCD device may be removed and it may be possible to control retardation when stress is applied to the display screen. As a result, light leakage may be reduced.

Second, polarizing films having negative photo-elasticity may be arranged at both lower and upper sides of the liquid crystal cell comprised of a pair of glass substrates with the liquid crystal layer disposed therebetween, and thus it may be possible to remove photo-elasticity of the LCD device. Consequently, it may be possible to more reliably control retardation generated in the glass substrates when stress is applied to the display screen and to reduce light leakage.

Third, when two compensation films are used as the substrate of the polarizers, it may not be necessary to include additional layers. Also, when any one of two compensation films is used as the substrate of the polarizers, it may be preferable to include one additional layer. As a result, it may be possible to obtain the same effects as described above and to reduce the production cost.

Fourth, when two compensation films are used as the substrate of the phase difference films, it may not be necessary to include additional layers in addition to the phase difference films. Also, when any one of two compensation films is used as the substrate of the phase difference films, it may be preferable to include one additional layer. As a result, it may be possible to obtain the wide viewing angle, prevent coloring from occurring, and remove photo-elasticity of the LCD device. Accordingly, when stress is applied to the display screen that displays high picture quality, it may be possible to control retardation and reduce light leakage.

Finally, since one of two compensation films may be used as the substrate of the polarizers and the other one may be used as the substrate of the phase difference films, it may not be necessary to include additional layers. As a result, it may be possible to obtain the same effects as described above to reduce the production cost.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A liquid crystal display device, comprising:
    first and second substrates each having a positive photo-elastic constant property and being an optical isotropic body when stress is not applied to the first and second substrates, the first and second substrates being the thickest among members constituting the liquid crystal display device and having the most retardation when an external force is applied to the liquid crystal display device such that the retardation in the substrates becomes retardation in the liquid crystal display device;
    a liquid crystal layer disposed between the first and second substrates and in direct contact with the first and second substrates; and
    first and second compensation films in direct contact with the first and second substrates, respectively, each compensation film having a negative photo-elastic constant (NPEC),
    wherein the first and second compensation films remove a photo-elastic effect of the first and second substrates that occurs when stress is applied to one of the first and second substrates to minimize retardation of light, and
    wherein the first and second NPEC compensation films are formed of a high polymer that includes styrene maleic anhydride.

2. The liquid crystal display device according to claim 1, further comprising:
    at least one polarizer disposed outside at least one of the first and second NPEC compensation films.

3. The liquid crystal display device according to claim 1, wherein the first and second NPEC compensation films are first and second polarizers for polarizing a light.

4. The liquid crystal display device according to claim 3, wherein the first NPEC compensation film functioning as the first polarizer defines a first single piece, and the second NPEC compensation film functioning as the second polarizer defines a second single piece.

5. The liquid crystal display device according to claim 1, wherein the first and second NPEC compensation films include first and second polarizers each having a negative photo-elastic constant.

6. The liquid crystal display device according to claim 1, wherein the first and second compensation films include first and second phase difference films each having a negative photo-elastic constant.

7. The liquid crystal display device according to claim 1, further comprising:
   first and second phase difference films disposed outside the first and second compensation films to compensate for optical distortion of the liquid crystal layer.

8. The liquid crystal display device according to claim 7, further comprising:
   first and second polarizers disposed outside the first and second phase difference films.

9. The liquid crystal display device according to claim 1, further comprising:
   a polarizer disposed outside the first compensation film; and
   a phase difference film disposed outside the second compensation film to compensate for optical distortion of the liquid crystal layer.

10. The liquid crystal display device according to claim 1, further comprising a first polarizer and a second polarizer each including one of the first and second compensation films in the form of a polymer substrate, and a polarizing layer coated on the polymer substrate.

11. The liquid crystal display device according to claim 10, wherein the polymer substrate of each of the first and second polarizers is formed of polystyrene.

\* \* \* \* \*